Nov. 29, 1932.  G. PIELSTICK  1,889,492
PISTON COOLING FOR COMBUSTION POWER ENGINES
Filed June 24, 1931
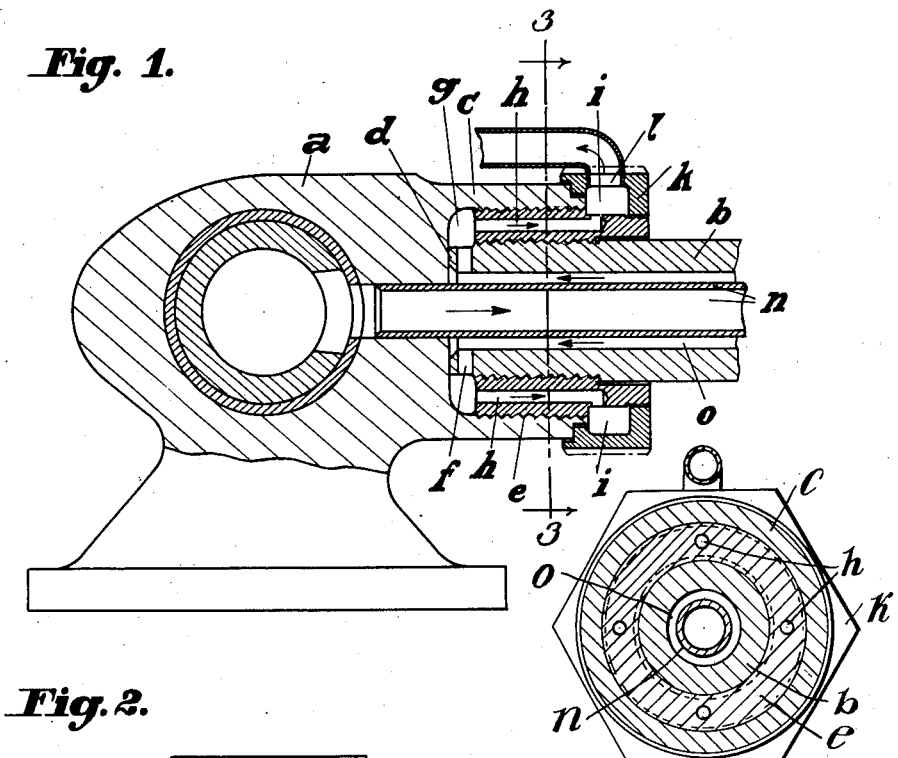
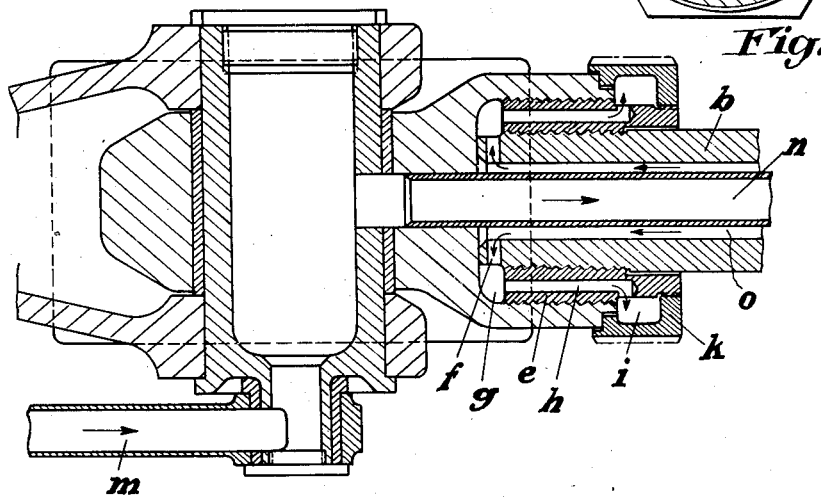
Inventor
Gustav Pielstick
by Maréchal & Noé
attorneys Patented Nov. 29, 1932

1,889,492

UNITED STATES PATENT OFFICE

GUSTAV PIELSTICK, OF AUGSBURG, GERMANY, ASSIGNOR TO MASCHINENFABRIK AUGSBURG-NÜRNBERG A. G., OF AUGSBURG, GERMANY, A CORPORATION OF GERMANY

PISTON COOLING FOR COMBUSTION POWER ENGINES

Application filed June 24, 1931, Serial No. 546,500, and in Germany July 25, 1930.

This invention relates to internal combustion engines and more particularly to engines having pistons adapted to be cooled by the circulation of a cooling fluid.

One object of the invention is the provision of a piston rod and crosshead construction for internal combustion engines, in which the end of the piston rod is secured by an attaching part to a hollow rod portion of the crosshead, the various parts having communicating passages for the flow of cooling fluid to and from the piston, the attaching part having a longitudinal passage or passages for leading off the cooling fluid in such a way as not to weaken the hollow rod portion of the crosshead.

Other objects and advantages of the invention will be apparent from the following description, the appended claims and the accompanying drawing, in which—

Fig. 1 is a central sectional view of a crosshead and piston rod construction embodying the present invention;

Fig. 2 is a horizontal sectional view taken centrally through the piston rod and crosshead pin; and Fig. 3 is a transverse section taken on the line 3—3 of Fig. 1.

The drawing shows the relationship between the end of the piston rod of an internal combustion engine and the crosshead slide. These parts are adapted for use in an engine in which cooling fluid is supplied to the piston, passing and returning through the hollow piston rod and being supplied through a suitable connection to the hollow pin of the crosshead which is in communication with the supply passage in the piston rod. The type of engine to which this construction is particularly adapted is high powered high speed engines which operate on the Diesel principle, although obviously the invention is not limited thereto.

As indicated by reference numerals in the drawing, the crosshead $a$ has a hollow rod portion $c$ adapted to receive the end of the piston rod $b$. The piston rod $b$, which is hollow to provide for the transfer of the cooling fluid, is in abutting engagement with the crosshead as indicated at $d$. The end of the piston rod is secured to the hollow rod portion of the crosshead by means of an attaching part $e$ formed as a hollow ring and having oppositely disposed inner and outer threads, the outer threads engaging the inner threads of the crosshead rod portion $c$, and the inner threads engaging threads on the piston rod. These threads transmit all of the forces between the piston rod and the crosshead so that the joint $d$ is not subjected to strain. Adjacent the joint $d$ there are radial passages $f$ through the end of the piston rod for the flow of the cooling medium which returns from the piston through the passage $o$ provided between the axial bore in the piston rod and the central conduit $n$ through which the cooling fluid is supplied to the piston. The passages $f$ discharge into an annular chamber $g$ in the crosshead.

The attaching part $e$ is provided with a plurality of longitudinal passages $h$ communicating at one end with an annular chamber $g$ in the crosshead and at the other end with the annular chamber $i$ formed in a cover member $k$ which is provided at the outer end of the attaching part. The passages $h$ may be longitudinal grooves extending along the outside of the attaching part $e$ so that the passages are completed by the threads of the rod portion $c$ of the crosshead, but preferably the passages $h$, as shown, are longitudinally extending bores located between the interior and the exterior threads of the attaching part. This cover member $k$ may be a part of the attaching part $e$ or may be secured or otherwise connected to its outer end. The cover $k$ serves as a closure or collecting chamber for the passages $h$ and is not subjected to mechanical strains. It is provided with a radial passage $l$ which leads to the discharge pipe so that the cooling medium may be directed to the exterior.

The cooling medium is supplied to the piston through the pipe $m$, the hollow crosshead pin, and the conduit $n$ provided in the piston rod, the crosshead pin having an opening provided for flow of the cooling medium to the conduit $n$ as will be readily apparent from Fig. 2. After flowing through the piston chamber the cooling fluid is returned through the annular space o and then passes through the passages f and h to the chamber i, and is then discharged. The discharge takes place from the cap or cover member k so that the hollow rod portion c on the crosshead is not weakened in any way and can assume the great strains and forces that occur in a high speed, heavy-duty engine.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In an internal combustion engine, a crosshead having a hollow rod portion, a piston rod having a longitudinal passage for the return flow of cooling fluid from the piston and having a conduit through which the cooling fluid may be supplied to the piston, and means connecting the piston rod to the rod portion of the crosshead comprising a hollow attaching part in engagement with the rod portion of the crosshead and in engagement with the piston rod, said attaching part having longitudinal passages in communication with the passage in the piston rod for leading off the cooling fluid.

2. In an internal combustion engine, a crosshead having a hollow rod portion, a piston rod having a longitudinal passage for the return flow of cooling fluid from the piston and having a conduit through which the cooling fluid may be supplied to the piston, and means connecting the piston rod to the rod portion of the crosshead comprising a hollow attaching part having exterior threads in engagement with the rod portion of the crosshead and having interior threads in engagement with the piston rod, said attaching part having longitudinal passages in communication with the passage in the piston rod for leading off the cooling fluid.

3. In an internal combustion engine, a crosshead having a hollow rod portion, a piston rod having a longitudinal passage for the return flow of cooling fluid from the piston and having a conduit through which the cooling fluid may be supplied to the piston, a hollow crosshead pin to which the cooling medium is supplied and having an opening in communition with said conduit, and a hollow attaching part connecting the piston rod to the rod portion of the crosshead, said attaching part being in the form of a ring having interior and exterior threads in engagement with the piston rod and the crosshead rod portion respectively, said attaching part having a longitudinal passage for leading off the cooling fluid from the passage in the piston rod.

4. In an internal combustion engine, a crosshead having a hollow rod portion, a piston rod having a longitudinal passage for the return flow of cooling fluid from the piston and having a conduit through which the cooling fluid may be supplied to the piston, and means connecting the piston rod to the rod portion of the crosshead comprising a hollow attaching part having exterior threads in engagement with the rod portion of the crosshead and having interior threads in engagement with the piston rod, said attaching part having longitudinal passages and said piston rod having radial passages in communication therewith and in communication with the longitudinal passage in the piston rod for leading off the cooling fluid.

5. In an internal combustion engine, a crosshead having a hollow rod portion, a piston rod having a longitudinal passage for the return flow of cooling fluid from the piston and having a conduit through which the cooling fluid may be supplied to the piston, means connecting the piston rod to the rod portion of the crosshead comprising a hollow attaching part in engagement with the rod portion of the crosshead and in engagement with the piston rod, said attaching part having longitudinal passages in communication with the passage in the piston rod for leading off the cooling fluid, and a cap engaging the outer end of said rod portion and provided at the outer end of said attaching part for receiving the cooling fluid from said longitudinal passages, said cap having a radial passage therein for discharging the cooling fluid at a point beyond the end of the said hollow rod portion.

In testimony whereof I affix my signature.

GUSTAV PIELSTICK.